Figure 1:
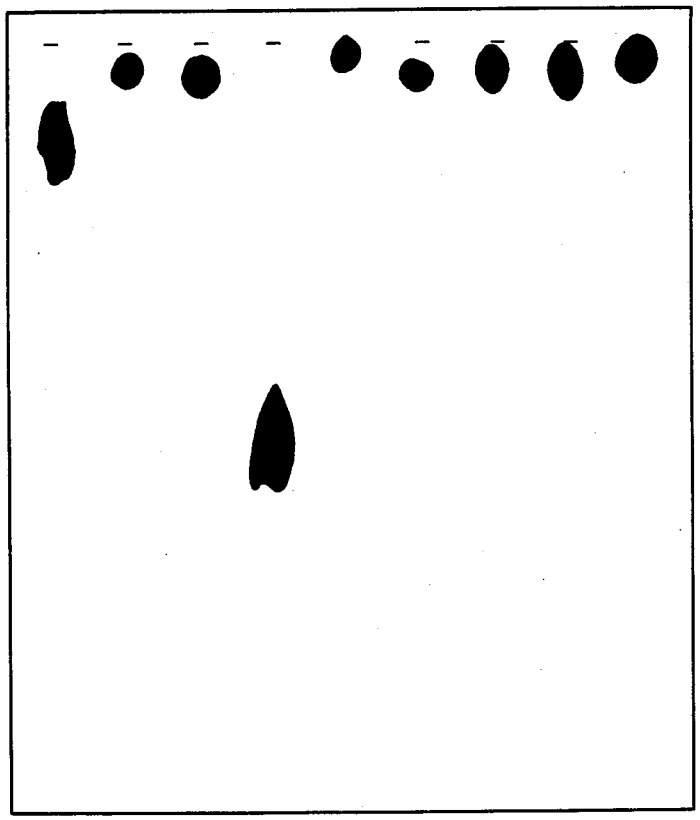

Dec. 4, 1962    M. H. McCORMICK ET AL    3,067,099
VANCOMYCIN AND METHOD FOR ITS PREPARATION
Filed Sept. 16, 1955    3 Sheets-Sheet 1

SOLVENT: n BUTANOL-ACETIC ACID
WATER 2:1:1

INVENTORS
MACK H. McCORMICK
JAMES M. McGUIRE
BY
ATTORNEYS

SOLVENT: 80% ETHANOL CONTAINING 1.5% SODIUM CHLORIDE

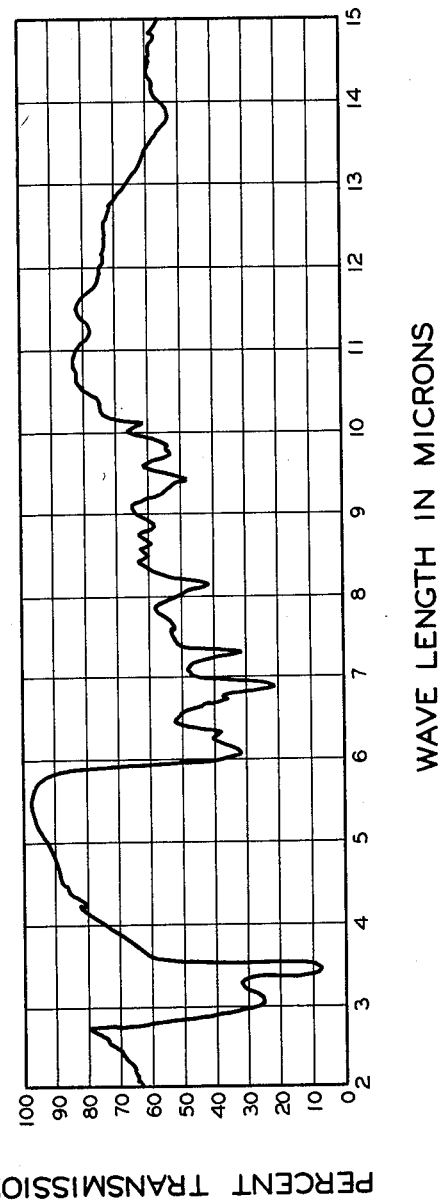

3,067,099
VANCOMYCIN AND METHOD FOR ITS PREPARATION

Mack H. McCormick, Lawrence, and James M. McGuire, Indianapolis, Ind., assignors to Eli Lilly and Company, Indianapolis, Ind., a corporation of Indiana
Filed Sept. 16, 1955, Ser. No. 534,666
6 Claims. (Cl. 167—65)

This invention relates to novel antibiotic compounds and more particularly to novel antibiotic agents elaborated by a previously undescribed microorganism, and to processes for their preparation.

We have isolated from soil obtained from the East Indies a microorganism whose morphological and cultural characteristics fit the description of the genus Streptomyces of the order Actinomycetales, as defined in Bergey's Manual of Determinative Bacteriology (Sixth Edition), page 938. The new microorganism is related in its microscopic morphology, cultural characteristics and physiology to certain of the microorganisms included in the S. albus and S. flavus groups, but does not fit the description of any one of the known species.

The new microorganism has therefore been given the name Streptomyces orientalis. Several strains of the organism which are designated as S. orientalis M43–05865, M5–18215 and M5–18260 have been found to produce the antibiotic substances of this invention; and these strains have been deposited in the culture collection of the Northern Regional Research Laboratories at Peoria, Illinois, where they have been assigned the culture numbers NRRL 2450, NRRL 2451 and NRRL 2452, respectively, and have been added to the permanent collection of microorganisms.

The microorganism was isolated from a sample of soil obtained from Tengeng, Indonesia, the method of isolation being the following: A sample of the soil was suspended in sterile distilled water, the suspension was greatly diluted and a small sample plated out on nutrient agar. The plate was incubated at about 30° C. for one week. The small scattered and discrete colonies of S. orientalis were removed with a platinum loop and were used to inoculate agar slants to provide larger quantities of the microorganism. One of the strains of this microorganism obtained as outlined hereinabove has been designated S. orientalis, Strain M43–05865, and the invention will be described with particular reference to this strain of the organism. It is to be understood, however, that the fermentative processes of this invention embrace the use of other antibiotic-producing strains of S. orientalis, such strains being readily produced and isolated by the commonly used isolation and strain modification methods which include selection of cultured organisms, and exposure of organisms to modifying means such as X-ray, ultraviolet light and chemical agents, for example, the nitrogen mustards.

We have found that when S. orientalis is grown upon artificial nutrient culture media containing a source of nitrogen, a source of carbohydrate and suitable inorganic salts of the type known to be required for the growth of microorganisms and to buffer the nutrient media, a new antibiotic substance is elaborated (herein denominated "vancomycin") which is characterized by its broad spectrum of activity against Gram-positive organisms.

The term "artificial nutrient culture medium" as used herein designates a culture medium which is prepared by combining sources of nitrogen, carbohydrates, mineral salts and water, as compared to naturally occurring substrates.

Sources of nitrogen which are suitable for the preparation of artificial nutrient culture media for use in the production of the new antibiotic vancomycin are exemplified by soybean meal, casein, peanut meal, corn-steep solids, corn-steep liquor, amino acids, distillers solubles, peptones and the like. Examples of the carbohydrates which are sources of carbon utilized by S. orientalis for growth of the microorganism, particularly when employed in the agar slant type culture media, are glucose, adonitol, arabinose, xylose, trehalose, mannitol, i-inositol, cellobiose, lactose and the like. The salts which are incorporated into the artificial nutrient media of the invention are the common mineral salts known to the art to be required for the growth of microorganisms and/or to regulate the acidity of the media, as, for example, sodium chloride, sodium nitrate, ammonium sulfate, calcium carbonate, sodium dihydrogen phosphate and the like. The minute quantities of the so-called trace elements required by living tissue are supplied by the addition of the above salts in which those elements occur as impurities.

S. orientalis is characterized by the numerous physical, cultural and physiological tests set forth in the following paragraphs. The system of Ridgway, Color Standards and Nomenclature (1912), is employed for the naming of some of the colors, and when that system is used, the initial letter of the color is capitalized.

MICROSCOPIC MORPHOLOGY

Synthetic agar (Czapek's agar as modified by Waksman (1919)).—Typical prostrate, much branched substratal mycelium, and erect, branching aerial mycelium bearing straight or irregularly branched chains of cylindrical to ovoid conidia measuring 0.7–1.0 x 1.4–1.8 microns. No conidial chains in distinct spirals. Conidia usually sparse after fourteen days' incubation at 30° C. After twenty-eight days, one strain showed moderately abundant spores; two other strains produced very few spores.

Glucose-asparagine agar.—Microscopic morphology like that observed on synthetic agar.

COLONIAL MORPHOLOGY

Synthetic agar (fourteen days at 30° C.).—Colonies 6 to 8 mm. in diameter, raised or slightly convex, with very thin cover of off-white aerial mycelium. Reverse colorless.

Glucose-asparagine agar (fourteen days at 30° C.).—Colonies 6 to 8 mm. in diameter, umbonate with asporogenous or poorly sporulated central papilla. Aerial mycelium powdery, off-white in color. Reverse intense cream yellow color.

CULTURAL CHARACTERISTICS

Synthetic agar.—Scant to moderate amount of substratal mycelium, pale cream color on reverse side. Trace of off-white aerial mycelium. No soluble pigment. Other strains produced slightly more aerial mycelium. When starch replaced sucrose as carbon source, all strains showed good vegetative and aerial growth, and all produced a characteristic cloudiness in the agar around the margin of growth. Substratal mycelium on reverse side ranges from pale cream to intense Cream Buff or Sayal Brown. Aerial mycelium is commonly off-white to very slightly grayish, and a pale yellowish brown to light brown soluble pigment is formed.

Glucose-asparagine agar.—Moderate to good growth of substratal mycelium, cream color becoming Light Ochraceous Buff on reverse side. Moderate amount of pale cream-colored, powdery aerial mycelium which becomes Pale Ochraceous Buff after twenty-eight days' incubation. Trace of pale greenish-yellow soluble pigment. Other strains appeared identical with the type culture on this medium.

*Starch agar (Waksman (1919), page 82, medium 15 with soluble starch).*—Moderate amount of substratal mycelium, on reverse side ranging from cream color when young through Cream Buff to Buckthorn Brown at final observation. Moderate amount of smooth, powdery aerial mycelium, white in young cultures becoming pale cream and finally slightly gray in color during maturation. Trace of pale cream yellow soluble pigment in young cultures darkening to pale brown at twenty-eight days. Starch hydrolysis poor on plates (1–3 mm. from margin of growth) at fourteen days; unchanged at twenty-eight days. Other strains varied slightly in amount and color of aerial mycelium and of soluble pigment formed. Differences appeared to be quantitative.

*Calcium malate-glycerol agar.*—Moderate amount of substratal mycelium, on reverse side ranging from pale cream color when young to intense cream yellow at twenty-eight days. Moderate amount of powdery, smooth aerial mycelium, slighly off-white in color. No soluble pigment. Growth restricted to line of inoculation. Insoluble malate cleared in agar around growth.

*Waksman's nutrient agar.*—Moderate amount of substratal mycelium, cream color on reverse side. Trace of white aerial mycelium. No soluble pigment. Growth restricted to line of inoculation.

*Emerson's agar.*—Abundant substratal mycelium, on reverse side brownish-cream color (near Mars Yellow) becoming Buckthorn Brown at twenty-eight days. Moderate amount of powdery aerial mycelium, off-white becoming pale Cartridge Buff at maturity. Surface of growth rough and deeply fissured; transient droplets of clear exudate near butt of slant. Trace of light brown soluble pigment, gradually increasing in amount with continued incubation. Amount of aerial mycelium produced by different strains varied widely, one being mottled with minute sectors having a very pale blue color. Amount of brown soluble pigment also varied; a greenish-brown pigment was formed by one culture.

*Potato plug.*—Substratal and aerial mycelium moderate in amount, restricted and with slightly rough (but not fissured) surface. Aerial mycelium white. Slight to moderate amount of brown discoloration of plug.

*Gelatin.*—Moderate amount of flocculent surface growth not forming intact pellicle. Aerial mycelium scant, white. Scant submerged growth. No soluble pigment. Liquefaction moderate in rate; none in seven days, about half complete (25–35 mm.) in fourteen days and complete in fourteen to seventeen days depending on strain.

*Synthetic broth (nutrient formula of synthetic agar).*—Scant growth of flocculent pellicle with no aerial mycelium. Many submerger colonies attached to wall of tube. No soluble pigment.

*Tyrosine broth.*—No growth.

*Glucose nutrient broth.*—Heavy wrinkled pellicle with scant white aerial mycelium. Moderate amount of membranous submerged growth. Small amount of brown soluble pigment beneath pellicle.

*Litmus milk (30° C.).*—Good growth of all strains in form of heavy wrinkled pellicle with dull gray aerial mycelium. No coagulation. Hydrolysis partial in eleven to fourteen days and complete in fourteen to twenty-one days depending on strain. Very dark soluble pigment obscures litmus color after fourteen days; but prior to that time, reaction neutral becoming alkaline. Final pH (at twenty-eight days, pooled sample): 7.80 to 8.00. No significant strain differences.

*Litmus milk (37° C.).*—All changes similar to those at 30° C. Final pH 7.46.

In broad outline, a preferred method of producing vancomycin is as follows: A sterile nutrient agar slant is inoculated with spores of the microorganism *S. orientalis* and is incubated for several days at about 30° C. to provide an abundance of spores. The spores are harvested and are employed to inoculate a liquid nutrient medium which is used to provide a vegetative inoculum after fermentation. The inoculated medium is shaken under aerobic conditions for forty-eight hours at about 26° C. during which time the spores develop into a vegetative inoculum. The vegetative inoculum thus obtained is used to inoculate liquid artificial nutrient culture media for the production of large quantities of fermentation broth containing vancomycin.

If desired, the steps of spore formation and production of the vegetative form of the microorganism can be omitted, and the production medium can be inoculated directly with spores. Such a procedure is primarily suitable for the production of small quantities of the antibiotic. For large-scale manufacture massive inoculation of the production medium by means of a vegetative inoculum is preferable to avoid the growth-lag of the organism and the consequent inefficient use of large-scale equipment.

After inoculation, the liquid production medium is agitated under aerobic conditions at a temperature within the range of about 25 to 37° C. for about one to six days. At the end of the period of incubation, during which period a substantial amount of antibiotic has been produced, the mycelium is removed from the fermented broth by any suitable means such as filtration or centrifugation, and the antibiotic substances are then recovered from the broth by suitable procedures as, for example, by adsorption processes using suitable adsorbants, for example, carbon, ion exchange resins and the like. In this way, vancomycin, its complexes with organic reagents or salts are utilized for recovery. Purification can be effected by countercurrent extraction employing organic solvent-containing systems and the like.

The following examples illustrate the preparation and properties of vancomycin:

*Example 1*

An agar slant is prepared containing the following ingredients:

| | |
|---|---|
| Starch | g__ 20 |
| Asparagine | g__ 1 |
| Beef extract | g__ 3 |
| Agar | g__ 20 |
| Water | liters__ 1 |

The slant is inoculated with spores of *S. orientalis*, Strain M43–05865, and is incubated for about 10 days at 30° C. The medium is then covered with sterile distilled water and scraped to loosen the spores. The resulting suspension of spores is preserved for further use in the process.

A liquid nutrient culture medium is prepared as follows:

| | |
|---|---|
| Glucose | g__ 15 |
| Soybean meal | g__ 15 |
| Corn-steep solids | g__ 5 |
| Sodium chloride | g__ 2 |
| Calcium carbonate | g__ 2 |
| Water | liters__ 1 |

The medium is sterilized at 120° C. for about 30 minutes in a suitable flask and cooled. Ten ml. of a spore suspension prepared as set forth above are used to inoculate the medium. The inoculated medium is shaken for 48 hours at 26° C. on a reciprocating shaker having a 2-inch stroke, at 110 r.p.m. The fermented culture medium which comprises a vegetative inoculum is used to inoculate a nutrient culture medium containing the following ingredients:

| | |
|---|---|
| Blackstrap molasses | g__ 20 |
| Soybean peptone | g__ 5 |
| Glucose | g__ 10 |
| Sucrose | g__ 20 |
| Calcium carbonate | g__ 2.5 |
| Water | liters__ 1 |

The medium is placed in a container having a suitable excess capacity in order to insure the presence of sufficient oxygen and is sterilized by heating at 120° C. for about 30 minutes. When cool, the medium is inoculated with about 25 ml. of a vegetative inoculum as described above, and the culture is then shaken for about 80 hours at 26° C. The pH of the medium at the beginning of fermentation ranges from about 6.5 to about 7.0 and the final pH is about 7.0 to about 8.0. A fermentation broth thus obtained contained about 180 mcg. of vancomycin per ml.

An additional culture medium suitable for the large-scale production of vancomycin is prepared as follows:

The following ingredients are mixed:

| | Parts |
|---|---|
| Starch | 30 |
| Molasses | 20 |
| Soy peptone | 7.5 |
| Acid hydrolysate of vegetable protein (Sta-Mino Type A, Staley) | 2.5 |
| Water | 1,000 |

The pH of the medium is adjusted to about 7–7.2, and then the solution is autoclaved for 30 minutes at about 15 pounds' steam pressure.

Another culture medium suitable for production purposes is prepared by admixture of the following ingredients:

| | Parts |
|---|---|
| Starch | 30 |
| Hydrolyzed soybean oil meal | 15 |
| Fermentation soluble obtained from *Clostridium acetobutylicum* fermentation of corn | 5 |
| Water | 1,000 |

The medium is adjusted to pH 7.0–7.2, and is autoclaved at 15 to 17 pounds' pressure for 30 minutes before use.

For production of vancomycin using the culture media set forth above, the media are placed in tanks provided with means for the introduction of air under pressure, are inoculated with a vegetative culture of the microorganism *S. orientalis*, and are fermented for about 4–6 days at temperatures in the range of 30–33° C. while stirring and introducing about 0.4 volume of air per volume of culture broth per minute. Thereafter, the mycelium is removed from the culture medium and the clear broth is treated for the recovery of the vancomycin as disclosed in the following examples.

*Example 2*

An inoculant broth is prepared having the following composition.

| | |
|---|---|
| Glucose | g-- 600 |
| Tryptone | g-- 200 |
| Basaminbact (amino acids produced by enzymatic conversion of primary yeast) | g-- 100 |
| Water | liters-- 40 |

Twenty liters of the medium are placed in a fermenter of 40 liters capacity and are sterilized by heating with steam under pressure at about 120° C. for about 20 minutes. The sterilized broth is cooled and inoculated aseptically with spores of *S. orientalis*, NRRL 2450, obtained by scraping an agar slant culture of this organism as described hereinabove. The organism is grown in the broth at about 32° C. for a period of about 24 hours. During the growth period the broth is stirred at about 225 r.p.m. and aerated with sterile air in amount of about 0.4 volume of air per volume of culture broth per minute. After fermentation is completed, this broth is employed to inoculate the production medium described below.

In a 350 gallon iron fermenter is placed a fermentation medium suitable for large scale production of vancomycin, having the following composition.

| | Kg. |
|---|---|
| Dextrin, white | 18.9 |
| Glucose | 14.2 |
| Acid hydrolysate of vegetable protein (Sta-Mino Type A, Staley) | 2.36 |
| Meat peptone (Wilson's Peptone No. 159, wet) | 14.2 |
| Solubles obtained from fermentation of corn with *Clostridium acetobutylicum* (B-Y fermentable solubles) | 4.73 |
| Silicone antifoam agent (Dow-Corning Antifoam A) | As required |

Water to make 250 gallons.

The pH of the culture medium is adjusted to about pH 6.7 using 40 percent aqueous sodium hydroxide, and the culture medium is then sterilized by heating it with steam under pressure at about 120° C. for about 20 minutes. The broth is cooled, and about 4¼ gallons of a vegetative inoculum obtained as described hereinabove are added aseptically. The organism is grown in the medium for about 96 hours at a temperature of about 28–30° C. During the growth period the broth is stirred at about 150 r.p.m. and sterile air is blown into the broth at the rate of 12 cubic feet per minute, or about 0.4 volume of air per volume of culture broth per minute. From time to time amounts of antifoam agent are added as required. At the end of the growth period microbiological assay of the broth indicates that it has antibiotic potency equivalent to about 200 mcg. of vancomycin activity per ml. of broth. The pH of the broth after fermentation is about 7.6. The broth is filtered to remove the mycelium, and the clear filtrate is subjected to procedures hereinafter described for the removal therefrom of the vancomycin.

Sixty-six liters of culture broth filtrate were adjusted to pH 7 with concentrated hydrochloric acid and passed over 2 liters (packed volume, prepared using an aqueous suspension) of an amine-formaldehyde ion-exchange resin of the type described in U.S. Patent No. 2,671,059, such as that available commercially under the name "Permutit" DR (a decolorizing ion exchanger sold by The Permutit Company, New York, New York) at pH 8.5 contained in a 4-inch glass column. (The resin had been previously regenerated to the hydroxyl form from the sulfate form by passing through the column bed one volume of 4 percent NaOH at the rate of 3 ml./cm.² cross sectional area/minute. The resin was washed for about one hour with distilled water at the rate of about 6 ml./cm.² cross sectional area/minute. The resin was then washed with distilled water at the rate of about 0.5 ml./cm.² cross sectional area/minute until the pH of the effluent fell below pH 9.) The effluent was discarded and the resin having the antibiotic substance adsorbed thereon was washed with 10 liters of water, and the water washings were discarded. The antibiotic substance was eluted from the resin with 20 liters of a mixture composed of 1 part of glacial acetic acid, 30 parts of acetone, and 69 parts of water. The eluate, containing about 85 percent of the original antibiotic activity of the broth, was concentrated in vacuo to a volume of 15 liters to remove the acetone. The aqueous solution was adjusted to pH 7 with NaOH solution and was stirred 80 minutes with 860 g. of activated carbon ("Norit" SG sold by the American Norit Company, Jacksonville, Florida). The carbon was removed by vacuum filtration on No. 4 Whatman filter paper, using as a filter aid a pad of "Hyflo Super-Cel" (diatomaceous earth sold by Johns-Manville Company). The filtrate was discarded and the carbon was washed with 10 liters of water and filtered again. The water wash was discarded. The antibiotic substance was eluted from the carbon with three 10 liter portions of 30 percent aqueous acetone acidified to pH 2 with concentrated sulfuric acid. The combined eluates containing about 75 percent of the original activity of the broth were concentrated in vacuo to a volume of about 10 liters and the concentrate was neutralized to pH 7 with sodium hydroxide solution. The neutralized aqueous solution was further concentrated to about 730 ml. by evaporation in vacuo, with gradual acidification to about pH 2.1 by addition of sulfuric acid. The antibiotic substance was precipitated from the acid solution by addition of an equal volume of a saturated solution of picric acid followed by refrigeration at about 5° C. for about 16 hours. The cold suspension was centrifuged and the supernatant liquid was removed. The moist solid was washed with 500 ml. of ice water, the wash water was discarded, and the solid was dissolved in a mixture of 100 ml. of methanol and 20 ml. of 10 percent aqueous hydrochloric acid. The acid solution was added to 2 liters of acetone, whereupon a light tan solid precipitated. After standing under refrigeration for about 2 hours the suspension was removed by centrifuging and the supernatant liquid was discarded. The remaining solid was washed with 2.8 liters of acetone and 200 ml. of diethyl ether. The wash liquids were decanted off and the solid was dried overnight in vacuo. The hydrochloride salt of vancomycin thus obtained was a whitish-tan amorphous powder which weighed about 10.88 g., and assayed about 900 mcg./mg.

Example 3

16.25 liters of filtered culture broth, obtained by the procedure of Example 2, were adjusted to pH 8.5 with 10 percent aqueous sodium hydroxide and were passed over about 6.5 liters of a cation exchange resin comprising a copolymer of methyl acrylate and divinyl benzene and having functional carboxyl groups (such as that available commercially under the designation "IRC"-50, a carboxylic acid type cation exchange resin sold by Rohm and Haas Company) in the sodium cycle at about pH 8.5. The resin had been previously regenerated from the hydrogen cycle with 4 percent aqueous sodium hydroxide to a pH value above about pH 8.5, and then washed down to pH 8.5 with water. After the broth filtrate had been passed over it, the resin was washed with water until the effluent became colorless. The antibiotic activity adsorbed on the resin was eluted by passing 0.1 N sulfuric acid over the resin, the effluent being collected until the pH of the effluent reached pH 2. (In this elution procedure, dilute ammonium hydroxide solution can also be employed as an alternative method for removing the antibiotic agent from the resin.) The eluate was neutralized to pH 7 with hot aqueous barium hydroxide solution, the barium sulfate precipitate was filtered off and the filtrate was concentrated to a volume of about 2.25 liters by evaporation in vacuo. This residue was stirred for about 60 minutes with 250 g. of acetic acid washed activated carbon ("Norit" SG). The carbon suspension was filtered and the filtrate was discarded. The cake was washed with 2 liters of water, the washings were discarded and the antibiotic material was eluted from the carbon with three 3 liter portions of 50 percent ethanol acidified to about pH 2 with hydrochloric acid. The combined eluates were concentrated in vacuo to a volume of about 20 ml. and were treated with an equal volume of a saturated solution of picric acid. The resulting precipitate of antibiotic material was removed by centrifugation. The supernatant liquid was discarded and the solid was dissolved in 20 ml. of methanol saturated with hydrogen chloride. About 200 ml. of ether were added, whereupon a precipitate was formed, consisting of the hydrochloric acid salt of vancomycin in crude form. The precipitate was recovered by centrifugation. The supernatant liquid was discarded and the residue of crude hydrochloride salt was dissolved in methanol and reprecipitated by addition of acetone. The hydrochloride salt of vancomycin thus prepared was an amorphous white powder weighing about 440 mg. and having antibiotic activity of about 900 mcg./mg.

Example 4

Nineteen liters of a filtrate of culture broth obtained by the procedure of Example 2 were adjusted to about pH 7 with 10 percent aqueous sodium hydroxide, and the neutral mixture was filtered. The filtrate was passed through a column containing a bed of an ion exchange resin ("Permutit" DR) 5 cm. in diameter and 32 cm. deep, which had previously been converted to the hydroxyl cycle according to the procedure described in Example 2. After all of the filtrate had been passed over the column, the ion exchange resin was washed with water until the effluent was substantially colorless. The antibiotic substance which was retained on the column was eluated from the resin using 5 liters of a mixture consisting of 1 part of glacial acetic acid, 30 parts of acetone and 69 parts of water. The eluate was concentrated to about 800 ml. by evaporation in vacuo. The resulting cloudy aqueous residue was adjusted to pH 7.0 by the addition of 10 percent aqueous sodium hydroxide, whereupon a clear solution was formed. To the neutralized solution were added 2200 g. of activated carbon ("Norit" SG). After thorough mixing, the carbon was removed by filtration and washed thoroughly with water. The filtrate and washings were discarded, and the vancomycin present on the carbon was eluted with 6 liters of 50 percent ethanol previously adjusted to pH 2 with sulfuric acid. The eluate was concentrated by evaporation in vacuo to a volume of about 500 ml., and the residue was filtered. The filtrate was adjusted to about pH 3 by addition of a hot solution of aqueous barium hydroxide, and then further concentrated to a volume of about 80 ml. To the concentrated solution were added 150 ml. of a saturated aqueous solution of picric acid. A precipitate of vancomycin picrate formed and was removed by centrifugation. The supernatant liquid was discarded and to the solid residue was added a mixture containing 10 ml. of 6 N sulfuric acid in 100 ml. of aqueous acetone, whereupon the vancomycin picrate was dissolved and converted to vancomycin sulfate which remained in solution. To the aqueous acetone solution were added 800 ml. of acetone, whereupon the vancomycin sulfate precipitated. The precipitate was removed by filtration, washed with acetone and dried. Vancomycin sulfate thus obtained weighed about 1.125 g. and was an amorphous, substantially white powder which upon microbiological assay contained about 900 mcg./mg.

Example 5

Sixty-four grams of a crude preparation of vancomycin hydrochloride obtained by the method of Example 2, assaying about 820 mcg./mg. and containing a considerable amount of brown pigment, were dissolved in 13 liters of water. The solution was adjusted to about pH 7.0 with solid sodium hydroxide and became cloudy as it was neutralized. The cloudy solution was acidified to about pH 5.0 with concentrated hydrochloric acid, whereupon the solution became clear. The clear acidic solution was stirred for about one hour with 1420 g. of activated carbon ("Norit" SG which had previously been washed successively with acetic acid and water, and oven dried). The carbon was removed by filtration and washed thoroughly with water. The washed carbon cake was eluted with 3 successive portions of 50 percent ethanol adjusted to about pH 3 with hydrochloric acid, the volume of the first eluent being 17.5 liters and that of the succeeding 2 eluents being 12.5 liters. The combined eluents were concentrated to about 300 ml. in vacuo, the pH being maintained at about pH 3. The concentrated solution was poured into 4 liters of cold acetone, whereupon a white precipitate of the hydrochloride salt of vancomycin precipitated. The acetone containing the precipitate of vancomycin hydrochloride was refrigerated for about 2 days and then was filtered. The filter cake was washed with acetone and with ether and was dried in vacuo for about 2 hours. The drying of the solid was completed by allowing it to stand overnight at room temperature. A total amount of 39 g. of amorphous white vancomycin hydrochloride was obtained, which on microbiological assay was found to have antibiotic activity of about 900 mcg./mg.

Example 6

One gram of the hydrochloride salt of vancomycin (prepared according to the process of Example 5) was dissolved in 20 ml. of 75 percent aqueous methanol and the pH of the solution was adjusted to about pH 7 by the addition of dilute aqueous sodium hydroxide. A precipitate of uncombined vancomycin was formed and was permitted to stand for about 18 hours at 5° C. The resulting white suspension was centrifuged and the solid was washed with successive portions of cold methanol and ether, and dried in vacuo.

Vancomycin thus prepared weighed about 815 mg. and was an off-white colored, amorphous powder assaying 950 mcg./mg.

Electrometric titration of vancomycin in a dimethylformamide-water solution (2:1, parts by volume), the starting pH of which was 7.75, revealed the presence of ionizable groups of pK'α at 5.2, 6.1, 7.5, 9.3, 10.1 and 11.5.

Example 7

A solution was prepared containing 43 g. of vancomycin sulfate assaying about 880 mcg./mg. in one liter of water. The clear solution, which had pH of about 2.2, was adjusted to about pH 6.1 by the addition of an anion exchange resin comprising a copolymer of styrene and divinyl benzene and having functional amine groups, as described in U.S. Patent No. 2,591,574, such as that available commercially under the designation "IR–45" in basic or hydroxyl form. The cloudy supernatant liquid was decanted off and the resin was washed with 500 ml. of water. The wash water was added to the supernatant liquid and the pH of the solution was lowered to about pH 1.8 by the addition of a cation exchange resin comprising polystyrene having functional nuclear sulfonic acid groups, in acidic form. An example of a resin of this type is that available commercially under the trade-mark "IR–120." The resin was removed from the clear liquid by filtration and the filtrate was again treated with basic anion exchange resin (IR–45) until the pH was about 7.2. The supernatant liquid was again decanted, acidified to about pH 1.8 with the acidic cation exchange resin and filtered. The filtrate was then neutralized with basic anion exchange resin to about pH 7.0, the supernatant liquid was decanted and adjusted to about pH 2.5 with 10 percent aqueous hydrochloric acid. The resulting solution, containing vancomycin hydrochloride, was concentrated under reduced pressure to a volume of about 150 ml. and the concentrated solution was added to 2 liters of cold acetone. The mixture was refrigerated for about 4 days, and thereafter the white precipitate of vancomycin hydrochloride which had formed was removed by filtration and washed with successive portions of acetone and ether. The moist solid was subjected to drying under reduced pressure for 2 days and was then permitted to stand in air to complete drying. A total yield of 39.4 g. of amorphous white vancomycin hydrochloride was obtained, which upon microbiological assay contained about 925 mcg./mg.

The inhibitory action of antibiotic vancomycin hydrochloride against representative microorganisms is set forth in Table I. The antibacterial activities were determined by the broth-dilution test method. In this method, the test organisms were grown in nutrient broth containing various concentrations of vancomycin. The concentrations shown in the table are the minimum concentrations of vancomycin in mcg./ml. of substrate which inhibited growth of the test organisms over incubation periods of 24 and 48 hours, respectively, at 37° C.

TABLE I

| Test Organism | Inhibitory Concentration (mcg./ml.) | |
|---|---|---|
| | 24 hours | 48 hours |
| Bacillus brevis | 3.13 | 3.13 |
| Bacillus cereus | 3.13 | 3.13 |
| Bacillus licheniformis | 0.78 | 0.78 |
| Bacillus megatherium | 0.2 | 0.2 |
| Bacillus polymyxa | 0.39 | 0.39 |
| Bacillus subtilis | 0.39 | 0.39 |
| Corynebacterium diphtheriae | (*) | 0.78 |
| Micrococcus pyogenes var. aureus | 0.78 | 0.78 |
| M. pyogenes var. aureus (erythromycin resistant) | 1.56 | 1.56 |
| M. pyogenes var. aureus (penicillin resistant) | 0.78 | 0.78 |
| M. pyogenes var. aureus (streptomycin resistant) | 1.56 | 1.56 |
| M. pyogenes var. aureus H | 1.56 | 1.56 |
| Mycobacterium phlei | 12.5 | 25 |
| Mycobacterium smegmatis | (*) | 3.13 |
| Sarcina lutea | 0.78 | 0.70 |
| Achromobacter fischeri | >100 | >100 |
| Aerobacter aerogenes | >100 | >100 |
| Brucella bronchiseptica | >100 | >100 |
| Escherichia coli | >100 | >100 |
| Klebsiella pneumoniae | >100 | >100 |
| Mycobacterium avium | 100 | 100 |
| Proteus vulgaris | >100 | >100 |
| Pseudomonas aeruginosa | >100 | >100 |
| Shigella paradysenteriae | >100 | >100 |
| Candida albicans | >100 | >100 |
| Saccharomyces carlsbergensis | >100 | >100 |
| Aspergillus niger | >100 | >100 |
| Trichophyton rubrum | >100 | >100 |

*Insufficient growth to permit estimation of inhibition.

From the table presented hereinabove, it will be seen that vancomycin is active primarily against Gram-positive bacteria, has a limited activity against the mycobacteria, and appears to have no activity against Gram-negative bacteria employed in the tests. It is significant that strains of M. pyogenes var. aureus which are known to be highly resistant to certain widely used antibiotics are here shown to be as susceptible to the inhibitory action of vancomycin as is their antibiotic-sensitive parent culture.

The uncombined vancomycin is an amorphous, amphoteric substance which is soluble in water in acidic and basic pH ranges, and less soluble at neutrality. It is stable in solid form, and in aqueous solutions over a pH range of about pH 2.5 to 9. It is slightly soluble in lower alcohols and insoluble in most other organic solvents. Elementary analysis discloses that vancomycin contains about 7.17 percent of nitrogen and about 4.26 percent of chlorine. Determinations of the molecular weight of vancomycin by methods employing the ultracentrifuge indicate that the new antibiotic has a molecular weight in the range of about 3,000 to 3,200. Electrometric titration data appear to indicate that a number of functional groups are present in the molecule. Because of the low percentage of nitrogen and the relatively low molecular weight of vancomycin, it is apparent that the substance is not a protein or a polypeptide. A mineral oil mull of vancomycin had spectral absorption maxima in the infrared region at the following wave lengths, expressed in microns: 3.10, 3.41, 6.05, 6.30, 6.72, 6.84, 7.26, 7.64, 8.13, 8.50, 8.66, 8.87, 9.42, 9.76, 10.10, 10.34 and 11.24. The absorption at 3.41, 6.84 and 7.26 microns appears to be due at least in part to the mineral oil employed as a vehicle. In the accompanying drawings, FIG. 3 shows the absorption curve of said mull over a range of 2 to 15 microns. Owing to its amphoteric nature, vancomycin reacts with inorganic acids, for example, hydrochloric, sulfuric, phosphoric and the like acids, and for convenience the resulting compounds are referred to herein as salts, although they may not be true normal salts.

When isolated as the hydrochloride salt vancomycin is a white amorphous substance which is soluble in water, and is slightly soluble in ethanol and methanol. It is relatively insoluble in other organic solvents, such as chloroform, ether, ethyl acetate and butanol. Its solubility in water at pH 7.0 is about 1 mg./ml., and it is more soluble in water at lower pH values and pH values above pH 8.5–9. Vancomycin hydrochloride is stable in solid form and in aqueous solution at temperatures up to about 70° C. in the pH range of about 2.5 to 9.

When injected intravenously in white mice according to standard pharmacological test procedures, the acute toxicity of vancomycin hydrochloride expressed as the $LD_{50}$ (dose required to kill 50 percent of the animals), has been found to be about 453.7±42.2 mg./kg.

Vancomycin is clearly differentiated from the known antibiotics with which it can be compared on the basis of its physical characteristics, as is set forth below. The critical characteristics of the following known antibiotics are taken from Waksman et al., Actinomycetes and Their Antibiotics, Baltimore, 1953, Williams and Wilkins Company. The physical characteristics of vancomycin indicate that it most closely resembles these known substances according to Waksman's system of classification, but comparison shows that vancomycin is clearly distinguishable from the other antibiotics.

Netropsin: active against Gram-negative bacteria and is toxic, having an acute toxicity ($LD_{50}$) when injected intraveneously in white mice of 17 mg./kg.; vancomycin hydrochloride, 453.7 mg./kg.

Amicetin: solvent extractable and has stronger activity against mycobacteria than against Gram-positive bacteria; vancomycin is not solvent extractable and is active against Gram-positive bacteria.

Griseoflavin: soluble in ethyl acetate; vancomycin is insoluble in ethyl acetate.

Sulfactin: soluble in chloroform; vancomycin is insoluble in chloroform.

Vinacetin: soluble in organic solvents such as chloroform, ethyl acetate, butyl acetate and acetone; vancomycin is insoluble in these solvents.

Cinnamycin: inactive against Gram-positive rod shaped bacteria; vancomycin is active against these bacteria.

Viomycin: active mainly against mycobacteria; vancomycin is active against Gram-positive bacteria.

Nocardin: active against *E. coli;* vancomycin is not active against *E. coli.*

Erythromycin: soluble in ethyl acetate; vancomycin is insoluble in ethyl acetate.

Carbomycin: soluble in ethyl acetate; vancomycin is insoluble in ethyl acetate.

Micromonosporin: a protein; vancomycin is not a protein.

Neonocardin: active against *E. coli;* vancomycin is inactive against this microorganism.

Cardicin: soluble in butanol and active against fungi and bacteriophages; vancomycin is insoluble in butanol and active against Gram-positive microorganisms.

Proactinomycin: soluble in ethyl acetate; vancomycin is insoluble in ethyl acetate.

Picromycin: can be extracted with ether; vancomycin is insoluble in ether.

The accompanying drawings represent paper chromatograms obtained by chromatographing, with different solvent systems, vancomycin and other representative antibiotic agents. In each of the drawings, the base line of the paper chromatogram is indicated for each antibiotic by a short straight line.

Figure 2:
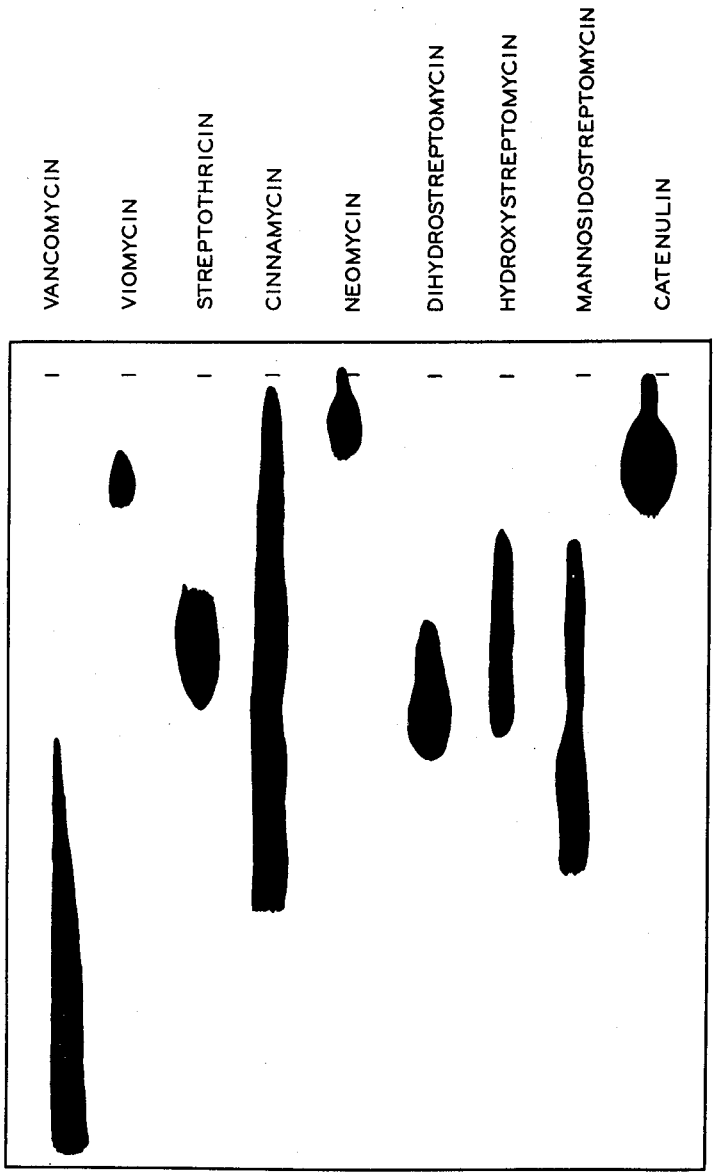

FIGURE 2 represents the chromatogram obtained when vancomycin, viomycin, streptothricin, cinnamycin, neomycin, dihydrostreptomycin, hydroxystreptomycin, mannosidostreptomycin, and catenulin are deposited upon Whatman No. 4 filter paper and are developed with an aqueous solvent consisting of 80 percent ethanol and 1.5 percent sodium chloride, buffered with 0.95 M sodium sulfate, and 0.05 M sodium hydrogen sulfate monohydrate.

FIGURE 1 represents the chromatogram obtained when the above-listed antibiotic substances are deposited upon Whatman No. 1 filter paper, and are developed with a solvent consisting of a mixture of 2 parts of n-butanol, 1 part of acetic acid, and 1 part of water.

Vancomycin has utility for the treatment of disease caused by Gram-positive bacteria and has been used successfully to treat streptococcal sore throat, erysipilas and pneumonia in human beings. In treating diseases of this character, vancomycin is conveniently provided in the form of a suitably buffered aqueous or substantially aqueous solution containing about 100 mg./ml. of the antibiotic, and this solution is preferably diluted before use with sterile normal saline solution or sterile glucose solution to a concentration of about 100 mg. of vancomycin in 10 ml. of solvent. The solution is generally administered by intravaneous injection in the amount of about 10 ml., administration preferably being repeated about every 6 to 8 hours for so long as antibiotic therapy is indicated.

We claim:

1. The antibiotic substance vancomycin, characterized as a white substance which is soluble in water and is stable in aqueous solution over the pH range of about pH 2.5 to pH 9, which is slightly soluble in lower alcohols, which is insoluble in most other organic solvents, which has a molecular weight in the range of about 3,000 to 3,200, which has ionizable groups of pK'a 5.2, 6.1, 7.5, 9.3, 10.1, and 11.5 as determined by electrometric titration in 2:1 dimethylformamide water solution, which contains about 7.17 percent nitrogen, which in a mineral oil mull displays in the infrared region over a wave length range of about 2 to 15 microns, absorption maxima at about the following wave lengths expressed in microns: 3.10, 3.41, 6.05, 6.30, 6.72, 6.84, 7.26, 7.64, 8.13, 8.50, 8.66, 8.87, 9.42, 9.76, 10.10, 10.34, and 11.24, having the infrared absorption spectrum shown in FIG. 3 of the drawings, said vancomycin being produced by cultivating under submerged, aerobic conditions a vancomycin-producing strain of *Streptomyces orientalis* in a culture medium containing assimilable sources of carbohydrate, organic nitrogen and inorganic salts at a temperature of about 25 to 37° C. for a period of about 1 to 6 days.

2. A method of producing vancomycin which comprises cultivating under aerobic conditions a vancomycin-producing strain of *Streptomyces orientalis* in a culture medium containing assimilable sources of carbohydrate, organic nitrogen and inorganic salts until substantial antibiotic activity is produced by said microorganism in said culture medium.

3. A method of producing vancomycin which comprises cultivating a vancomycin-producing strain of *Streptomyces orientalis* in a culture medium containing assimilable carbohydrate, organic nitrogen and inorganic salts under submerged aerobic conditions until substantial antibiotic activity is produced in said culture medium, and recovering the vancomycin from the said culture medium.

4. A method according to claim 3 in which the microorganism is *Streptomyces orientalis* strain NRRL 2450.

5. A method according to claim 3 in which the microorganism is *Streptomyces orientalis* strain NRRL 2451.

6. A method according to claim 3 in which the microorganism is *Streptomyces orientalis* strain NRRL 2452.

References Cited in the file of this patent

United States Dispensatory, 1961 Ed., vol. 2, "New Drug Developments Volume," entry "Vancomycin Hydrochloride, N.N.D.," pages 230–233.

New and Nonofficial Drugs, 1961, pages 150–1.

Waksman et al.: "The Actinomycetes and Their Antibiotics," pages 38, 39, 41, 49, 58, 77, 84, 172, 173, 185, 186, 1953, pub. by Williams & Wilkins, Baltimore, Md.

(Other references on following page)

Baldacci et al.: Archive für Mikrobiologie, Bd-20, pages 347–357 (1954).

Abstracts of Papers Nos. 11–13, presented at the 4th Annual Symposium on Antibiotics, October 17, 18 and 19, 1956, Washington, D.C., 4 pages.

Williams: Review of Sci. Instruments, 1948, page 142.

Gore et al.: Annals of the New York Academy of Sci., vol. 51, art. 5, page 924 (Polymyxin Book).

Geraci et al.: Antibiotics Annual, 1956–1957, Medical Encyclopedia, N.Y., pages 90–106.